J. W. EDMONDS.
Packing for Steam-Engine

No. 206,548.   Patented July 30, 1878.

WITNESSES:
W. C. Brookes
Chas. C. Stetson

INVENTOR:
John W. Edmonds
by his attorney

UNITED STATES PATENT OFFICE.

JOHN W. EDMONDS, OF JERSEY CITY, NEW JERSEY, ASSIGNOR TO HIMSELF AND CHARLES W. BENTON, OF SAME PLACE.

IMPROVEMENT IN PACKINGS FOR STEAM-ENGINES.

Specification forming part of Letters Patent No. 206,548, dated July 30, 1878; application filed July 17, 1878.

*To all whom it may concern:*

Be it known that I, JOHN W. EDMONDS, of Jersey City, Hudson county, State of New Jersey, have invented a certain new and Improved Packing for Steam-Engines and other similar purposes, of which the following is a specification:

According to my invention I take a composition of powdered black lead or graphite, talc, and sulphur, and combine the same with strands of cotton yarn (by preference very slightly twisted) within a woven or knitted sheath or cover, composed, by preference, of cotton twine. The packing, having been thus prepared, I coat with a compound of paraffine-wax, black lead, and tallow, mixed in the proper proportions, and boil well together.

The following is a description of what I consider the best means of carrying out the invention.

The accompanying drawings form a part of this specification.

Figure 1:
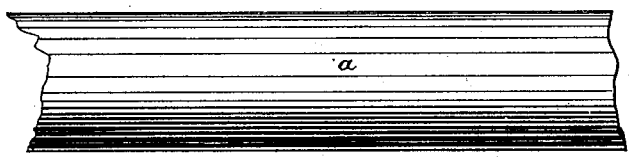
Figure 2:
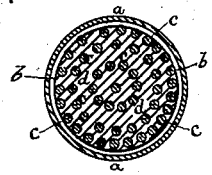
Figure 3:
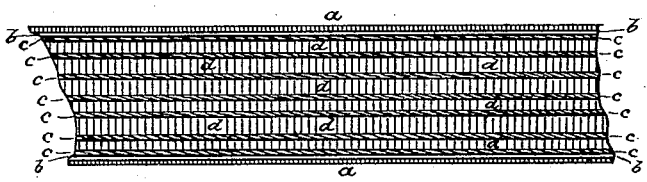

Figure 1 represents an external view, Fig. 2 a cross-section, and Fig. 3 a horizontal section, of a piece of packing constructed according to my invention.

In each of the views similars letters of reference indicate corresponding parts wherever they occur.

*a* represents the external coating; *b*, the woven sheath or cover; *c*, the internal strands of cotton yarn; and *d*, the composition, placed between the strands *c*.

My experiments indicate that the following is the best mode of preparing my improved packing: I take a suitable number of strands of cotton yarn, according to the size of packing required, and feed the same through a funnel by any suitable means. I at the same time insert between the strands of cotton *c* my improved compound of talc, black lead, and sulphur, hereinafter more fully described, and while the strands of cotton and the compound are passing from the tube of the funnel I weave or knit, by means of a braiding or other suitable machine, the sheath or cover *b* upon the inclosed material, so as to form a complete packing. The packing having been thus prepared, I dip it into or coat with a preparation composed of paraffine-wax, black lead, and tallow, prepared by boiling together, as hereinafter more fully explained.

The proportions of ingredients for forming the internal core of the packing which I have found to answer well are as follows: I take one hundred (100) pounds of finely-ground talc and add thereto fifty (50) pounds of finely-ground black lead or graphite and ten (10) pounds of the powdered sulphur of commerce, which ingredients I stir well together in any suitable receiver, and apply in the manner before described.

The composition for coating the external sheath or cover *b* I prefer to form from the ingredients named in the following proportions: I insert into a suitable caldron or boiler one hundred (100) pounds of paraffine-wax and twenty-five (25) pounds of good tallow, which are brought to the boiling-point, and to the mixture, while in a boiling state, I add twenty-five (25) pounds of powdered black lead or graphite, and stir the same together until the whole is well mixed. I then, by preference, dip my improved packing into this mixture while in a boiling state; but this is not necessary, as I have found by experiment that, by means of a brush or other suitable means, I can apply the last-named composition to the exterior of the sheath or cover of my improved packing, even after the heat of the combined mass has been reduced below the boiling-point and has become comparatively cold.

Although I have given the proportions of ingredients forming the composition of the core and of the external coating of my improved packing which I have found to answer best, I do not limit myself to those proportions, as the same may be varied within considerable limits without departing from the peculiar characteristics of my invention.

I can also apply my improved external coating composition, consisting of paraffine-wax, black lead, and tallow, to many of the packings now on the market and known among engineers.

In place of inclosing the internal core of my improved packing (composed of strands or threads of cotton and a composition of black lead, talc, and sulphur) within a knitted or woven sheath formed or woven around the packing in the process of manufacturing the same, I can inclose the strands of cotton and the compound by rolling the same in a sheet or sheets of woven material.

Although I preferably employ cotton in the manufacture of my improved packing, I can employ hemp, jute, or other suitable yarns or twine, both for the manufacture of the core and the external sheath or cover.

Having thus described my invention, I would have it understood that I do not claim, broadly, a packing constructed with a woven or knitted sheath or cover inclosing a series of strands of yarn, cotton, or other material, between which is placed a powdered substance or composition, as I am aware that packings have been previously made in that manner and are now sold in the open market; but

What I do claim, and desire to secure by Letters Patent, is—

A packing for steam-engines or other similar purposes, constructed with a woven or knitted sheath or cover, $b$, inclosing a series of strands of yarn or cotton, $c$, between which is placed a composition consisting of black lead, talc, and sulphur, the sheath or cover $b$ having an external coating, $a$, composed of paraffine-wax, black lead, and tallow, substantially as set forth.

In testimony whereof I have hereunto set my hand this 16th day of July, 1878, in the presence of two subscribing witnesses.

JOHN W. EDMONDS.

Witnesses:
 W. COLBORNE BROOKES,
 CHAS. C. STETSON.